United States Patent
Husain et al.

(10) Patent No.: US 9,008,999 B2
(45) Date of Patent: Apr. 14, 2015

(54) STEERING WHEEL AIRBAG POSITION DETECTOR

(75) Inventors: Shah Mohammed Asad Husain, Kitchener (CA); Andre Kenneth Gorden Good, Cambridge (CA); Gary Lee, Cambridge (CA); Martin Cina, Kitchener (CA); Nelson Leite, Waterloo (CA); Farhan Khan, Waterloo (CA)

(73) Assignees: Toyota Motor Engineering & Manufacturing North America, Inc., Erlanger, KY (US); Leite Automation Inc., Kitchener, Ontario (CA)

( * ) Notice: Subject to any disclaimer, the term of this patent is extended or adjusted under 35 U.S.C. 154(b) by 597 days.

(21) Appl. No.: 13/283,163

(22) Filed: Oct. 27, 2011

(65) Prior Publication Data

US 2013/0110453 A1    May 2, 2013

(51) Int. Cl.
 G01C 9/00    (2006.01)
 B60R 21/203    (2006.01)

(52) U.S. Cl.
 CPC .................. B60R 21/203 (2013.01)

(58) Field of Classification Search
 USPC ............................. 702/150; 74/552
 See application file for complete search history.

(56) References Cited

U.S. PATENT DOCUMENTS

| | | | |
|---|---|---|---|
| 4,598,481 A | 7/1986 | Donahue | |
| 4,969,249 A * | 11/1990 | Yamamoto et al. | 29/429 |
| 4,989,981 A | 2/1991 | Kawamura et al. | |
| 5,755,458 A | 5/1998 | Donovan | |
| 6,062,079 A | 5/2000 | Stewart | |
| 6,642,510 B1 | 11/2003 | Sugiyama et al. | |
| 6,700,671 B2 | 3/2004 | Akishiba | |
| 6,859,677 B2 | 2/2005 | Mitterholzer | |
| 7,181,856 B1 | 2/2007 | Hanchett et al. | |
| 7,639,373 B2 | 12/2009 | Torii et al. | |
| 2002/0125705 A1 | 9/2002 | Wong et al. | |
| 2004/0027586 A1 * | 2/2004 | Ichikawa et al. | 356/614 |
| 2004/0120568 A1 | 6/2004 | Kidd et al. | |
| 2004/0246471 A1 * | 12/2004 | Matsuura et al. | 356/141.4 |
| 2005/0257634 A1 * | 11/2005 | Someya et al. | 74/409 |
| 2006/0066836 A1 * | 3/2006 | Bridges et al. | 356/5.13 |
| 2007/0029766 A1 * | 2/2007 | Onohara | 280/731 |
| 2007/0210564 A1 * | 9/2007 | Vazquez et al. | 280/731 |
| 2007/0216143 A1 * | 9/2007 | Vazquez et al. | 280/731 |
| 2008/0119993 A1 * | 5/2008 | Breed | 701/46 |
| 2009/0066932 A1 * | 3/2009 | Bridges et al. | 356/5.13 |
| 2011/0089672 A1 * | 4/2011 | Nebel et al. | 280/728.2 |
| 2011/0181029 A1 * | 7/2011 | Radde et al. | 280/731 |
| 2011/0233905 A1 * | 9/2011 | Marotzke | 280/731 |
| 2012/0050714 A1 * | 3/2012 | McConville et al. | 356/4.01 |

(Continued)

*Primary Examiner* — Jonathan C Teixeira Moffat
*Assistant Examiner* — Alvaro Fortich
(74) *Attorney, Agent, or Firm* — Gifford, Krass, Sprinkle, Anderson & Citkowski, P.C.

(57) ABSTRACT

A component position detector for determining if a first component is properly attached to a second component. The component position detector can be a steering wheel airbag position detector that provides for a convenient and cost-effective apparatus and/or process for determining whether or not a steering wheel airbag is properly attached to a steering wheel. Such a steering wheel airbag position detector can include a jig that has a scan position, the scan position located on a front side of a steering wheel. In addition, the position detector can include a sensor rigidly attached to the jig, the sensor operable to perform a two-dimensional scan across a gap between the steering wheel and a steering wheel airbag and/or horn pad attached to the steering wheel.

15 Claims, 3 Drawing Sheets

(56) References Cited

U.S. PATENT DOCUMENTS

2012/0068446 A1* 3/2012 Miyata et al. .............. 280/743.2
2012/0098241 A1* 4/2012 Nebel .......................... 280/741
2012/0292895 A1* 11/2012 Schutz ........................ 280/731

* cited by examiner

STEERING WHEEL AIRBAG POSITION DETECTOR

FIELD OF THE INVENTION

The present invention is related to a component position detector, and in particular, a position detector that detects the position of a first component relative to a second component.

BACKGROUND OF THE INVENTION

The assembly of devices, machines, and the like having two or more components on an assembly line is known. In addition, the location of a first component relative to a second component during assembly of such a device, machine, etc. can be critical to overall performance and/or safety thereof. For example and for illustrative purposes only, a steering wheel assembly within a motor vehicle can include a steering wheel with a steering wheel airbag attached thereto. In addition, a horn pad can be used to cover the steering wheel airbag and is also attached to the steering wheel.

Proper attachment of the steering wheel airbag, and thus the horn pad, to the steering wheel is naturally desired for aesthetically pleasing reasons. Heretofore methods for determining whether or not the horn pad and steering wheel airbag are properly attached to the steering wheel have included visual inspection by an individual working on the assembly line. However, such a method can be time consuming and relatively costly. Therefore, an apparatus and/or process for determining whether or not the horn pad and steering wheel airbag are properly attached to the steering wheel in a cost-effective manner would be desirable.

SUMMARY OF THE INVENTION

A component position detector is provided. In some instances, the component position detector can be a steering wheel airbag position detector that provides for a convenient and cost-effective apparatus and/or process for determining whether or not a steering wheel airbag is properly attached to a steering wheel. In such instances, the steering wheel airbag position detector can include a jig that has a scan position, the scan position located on a front side of a steering wheel. In addition, the position detector can include a sensor operable to detect a gap between the steering wheel airbag and the steering wheel. For example and for illustrative purposes only, the sensor can be a scanner such as a laser, a camera, an ultrasonic transducer and the like rigidly attached to the jig, the scanner operable to perform a two-dimensional (2D) scan. In the event that the sensor is a laser, the laser can also be positioned to scan across the gap that is between the steering wheel and the steering wheel airbag and/or a horn pad attached to and covering the steering wheel airbag. The position detector can include a processor in communication with the laser, the processor operable to analyze the 2D laser scan of the gap and provide a pass signal and/or a no-pass signal as a function of the analyzed 2D laser scan.

The jig can include a first bar with a first flange that is dimensioned to extend over a circumferential portion of the steering wheel when the jig is in the scan position. In addition, the jig can have a second bar extending at an angle relative to the first bar, the second bar having a second flange dimensioned to extend over the circumferential portion of the steering wheel when the jig is in the scan position. In some instances, the second bar can include a pair of spaced apart flanges with each flange dimensioned to extend over the circumferential portion of the steering wheel and having a distance between each other such that the pair of flanges bound opposite sides of the circumferential portion of the steering wheel.

The processor can determine a lateral distance and/or an elevation distance between the steering wheel and the steering wheel airbag from the 2D laser scan of the gap therebetween. In addition, the pass signal provided by the processor can indicate that the gap between the steering wheel airbag and the steering wheel is within a predefined tolerance and the no-pass signal can indicate that the gap is not within the predefined tolerance. The processor can include a memory, or in the alternative a separate memory can be provided, that is operable to store data such as data in the form of a plurality of 2D laser scans, data in the form of a plurality of pass signals, data in the form of a plurality of no-pass signals, and combinations thereof.

A process for determining whether or not a first component has been properly attached to a second component is also provided. The process includes providing a first component and a second component, and attaching the first component to the second component with a gap existing between the two components. In addition, a component position detector is provided, the position detector having a jig with a scan position and a laser rigidly attached to the jig. The jig and the laser are operable to perform a 2D laser scan across the gap between the first component and the second component. In addition, a processor in communication with the laser is included and operable to analyze the 2D laser scan of the gap and provide a pass signal and a no-pass signal as a function of the analyzed 2D laser scan.

In some instances, the first component is a steering wheel bag and/or a horn pad attached to the steering wheel bag, and the second component is a steering wheel.

DETAILED DESCRIPTION OF THE PRESENT INVENTION

The present invention provides a component position detector that can determine if a first component is properly attached to a second component. As such, the present invention has utility as an apparatus or process that provides quality assurance during assembly of a device, machine, etc.

The component position detector can include a jig that can be positioned relative to a first component and a second component. The first component can be attached to the second component and the jig can have a scan position relative thereto. The jig can also have a sensor operable to detect a gap between the steering wheel airbag and the steering wheel. For example and for illustrative purposes only, the sensor can be a scanner such as a laser, a camera, an ultrasonic transducer and the like rigidly attached to the jig, the scanner operable to perform at least a two-dimensional (2D) scan of one or more locations, areas, regions, and the like relative to the first component and the second component. For example and for illustrative purposes only, the sensor and the jig in the scan position can be operable to scan a gap, gap region, gap area, etc. that is present between the first component and the second component when the two components are attached to each other and generate a 2D profile of the scan area.

In some instances, a laser can be rigidly attached to the jig and upon activation of the laser, the laser executes a 2D scan of the desired region and the laser scan results, data, etc. can be provided to a processor. The processor can accept laser scan data and from the data determine whether or not the first component is properly attached to the second component. For example, the processor can compare a laser scan taken by the laser to a predefined or previously taken laser scan stored in a memory. In addition, the processor can determine or derive a lateral distance and/or an elevation distance between the first component and the second component from the laser scan. In some instances, the processor can compare the laser scan, lateral distance and/or elevation distance to a stored laser scan, a stored lateral distance and/or a stored elevation distance.

A tolerance between a stored laser scan, a stored lateral distance, and/or a stored elevation distance and a subsequent 2D laser scan, lateral distance, and/or elevation distance can be set or defined by a user. In addition, the processor can determine if a current laser scan, lateral distance and/or elevation distance falls within the tolerance and thereby afford for a pass or no-pass signal to be provided to an individual attaching the first component to the second component.

Figure 1:
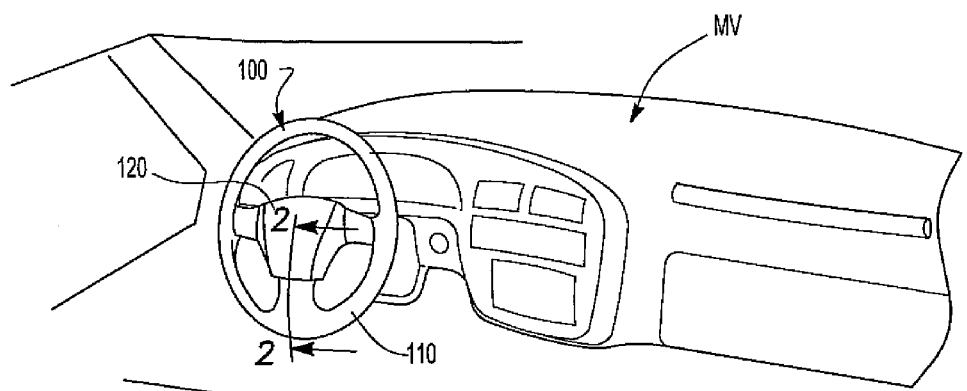
FIG. 1 is a schematic illustration of a steering wheel assembly within a motor vehicle.

Turning now to FIG. 1, a steering wheel assembly 100 within a motor vehicle MV is shown. The steering wheel assembly 100 can have a steering wheel 110 and a horn pad 120. The steering wheel 110 can have an outer circumferential portion 112, an inner circumferential portion 114 and at least two planar supports 116 that attach the outer and/or inner circumferential portions 112, 114 to a central portion of the steering wheel as is known to those skilled in the art and shown in FIG. 4. It is appreciated that the horn pad 120 can have a steering wheel airbag underneath as known to those skilled in the art. In addition, the horn pad 120 can be attached to the steering wheel airbag with the horn pad/steering wheel airbag combination attached to the steering wheel 110 as a single unit. As such, and for the purposes of the present invention, FIG. 1 illustrates a horn pad 120 or a steering wheel airbag 120 attached to the steering wheel 110.

Figure 2:
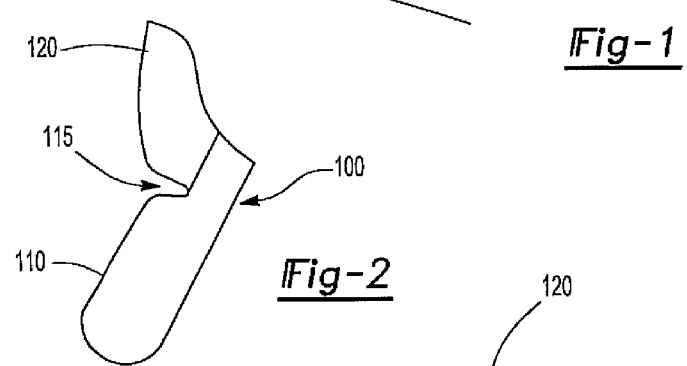
FIG. 2 is a side cross-sectional view of section 2-2 shown in FIG. 1.
Figure 3:
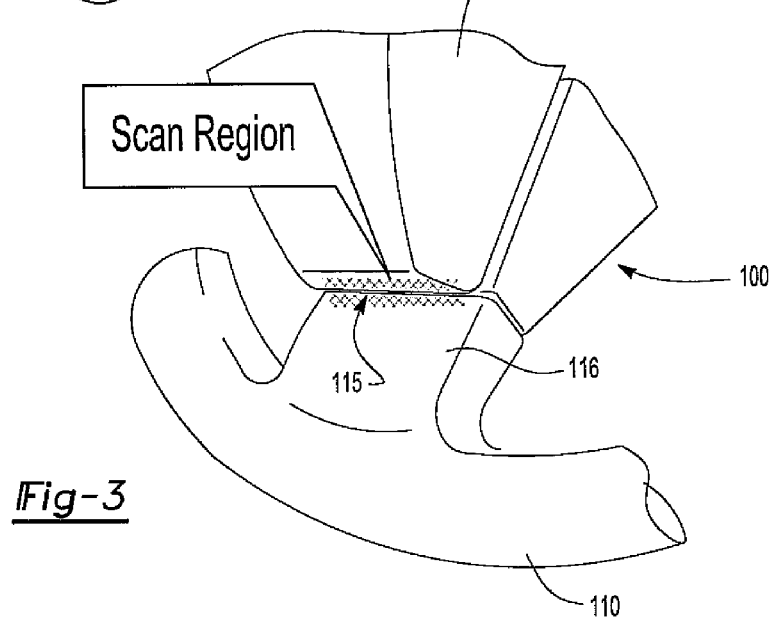
FIG. 3 is a schematic illustration of a scan region between a steering wheel and a horn pad attached to the steering wheel.

FIG. 2 provides a side cross-section view of section 2-2 shown in FIG. 1. As shown in this figure, a gap 115 can be present between the steering wheel 110 and the horn pad 120. In addition, the region adjacent to the gap 115 can be part of a scan region as shown in FIG. 3 and discussed in greater detail below. As such, the term gap 115 refers herein to also include the scan region illustrated in FIG. 3.

Figure 4:
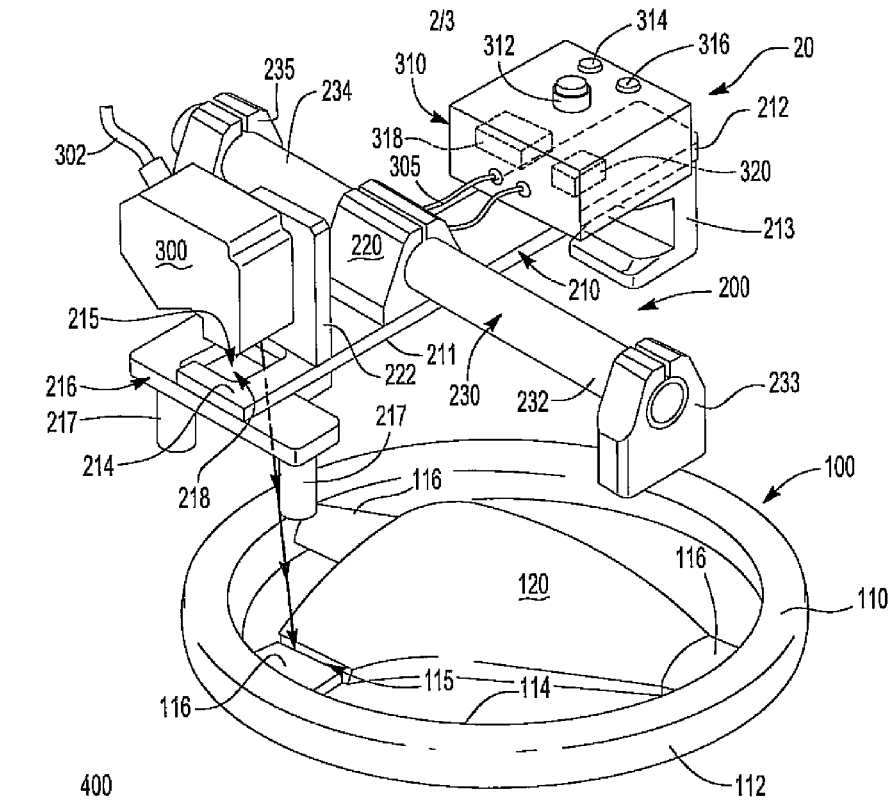
FIG. 4 is a schematic illustration of a component position detector according to an embodiment of the present invention.
Figure 5:
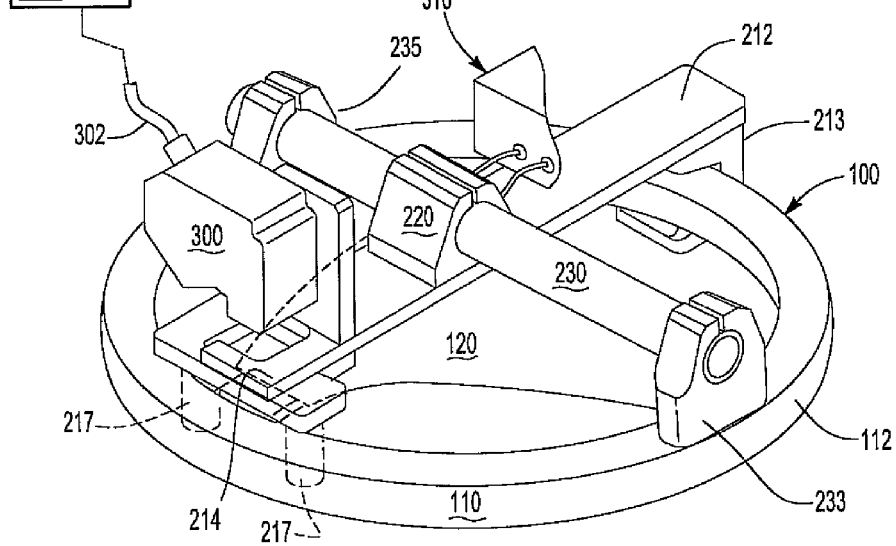
FIG. 5 is a schematic illustration of the component position detector shown in FIG. 4 attached to a steering wheel.

Looking now at FIGS. 4 and 5, a component position detector is shown generally at reference numeral 20. The position detector 20 can include a jig 200 with a sensor 300 rigidly attached thereto. The jig 200 can include a first bar 210 that has a first end 212 and a second end 214. The first end 212 can have a first flange 213, for example a generally L- or U-shaped flange that is operable to extend over a circumferential portion 112 of the steering wheel 110.

Attached to the second end 214 of the first bar 210 can be a positioning member 216 that can have a pair of positioning legs 217. The positioning legs 217 can extend beyond an inner circumferential portion of the steering wheel 110 on opposite sides of one of the planar supports 116, or in the alternative rest upon one of the planar supports 116 of the steering wheel 110 (see FIG. 3). In this manner, the first bar 210 and thus the laser 300 can be located at a desired, stable, and/or fixed location relative to the gap 115.

In some instances, the jig 200 can include a second bar 230 attached to the first bar 210, for example using a clamp 220, the second bar 230 extending from the first bar 210 at an angle. For example and for illustrative purposes only, the second bar 230 can be generally perpendicular to the first bar 210. In addition, the second bar 230 can have a first end 232 with a first flange 233 and a second end 234 with a second flange 235. It is appreciated that the first flange 233 and/or the second flange 235 are dimensioned such that they extend beyond and/or over the circumferential portion 112 of the steering wheel 110. In this manner, the jig 200 and thus the sensor 300 can be consistently located at a predefined location relative to the gap 115 between the steering wheel 110 and the horn pad 120.

In one embodiment, the sensor 300 is a laser attached to the jig 200 using a flange 222 such that the laser 300 can project a laser beam towards the gap 115. In addition, the second end 214 of the first bar 210 can have an opening 215 and/or the positioning member 216 can have an opening 218 such the laser beam from the laser 300 can reach the gap 115 and thereby afford for a 2D laser scan of the gap 115. It is appreciated that any type of laser known to those skilled in the art that can provide a 2D laser scan can be used, illustratively including LJ-G series 2D lasers from Keyence Corporation of America located in Itasca, Ill.

In some instances, the position detector 20 can further include a control box 310 having an activation button 312, an OK light 314, and a not good (NG) light 316. In addition, the box 310 can include a processor 318 and/or a memory 320. Once properly located and/or attached to the steering wheel 110, a user can depress the activation button 312 which can afford for the laser 300 to perform a 2D laser scan of the gap 115. The 2D scan can be provided to the processor 318 which can analyze the 2D scan and determine whether or not the horn pad 120 and thus the steering wheel airbag attached thereto is in a proper location. In the event that the horn pad 120 is determined to be at a desired location relative to the steering wheel 110 and/or within a defined tolerance from the desired location, the OK light 314 can be activated by the processor and thereby provide a pass signal to the user. In the alternative, if the processor 318 determines that the horn pad 120 is located outside of the defined tolerance from the desired location, the NG light 316 can be activated by the processor 318 and thereby provide a no-pass signal to the individual.

In other instances, the position detector 20 can include a laser controller 410 and activation controls 420 in an external control panel 400 which is in communication with the laser 300, activation button 312, OK light 314 and NG light 316 via electrical wiring 302 and 305. In the alternative, wireless communication can be used to communicate the laser 300 and/or the activation box 310 with the control panel 400. In addition, it is appreciated that the laser controller 410 and/or activation controls 420 can include the processor 318 and/or memory 320.

The control panel 400 can afford for signaling of one or more personnel that the horn pad 120 is properly attached or improperly attached to the steering wheel 110. In addition, the online processor 400 can slow or stop an assembly line until proper attachment of the horn pad 120 to the steering wheel 110 has been determined.

Figure 6:
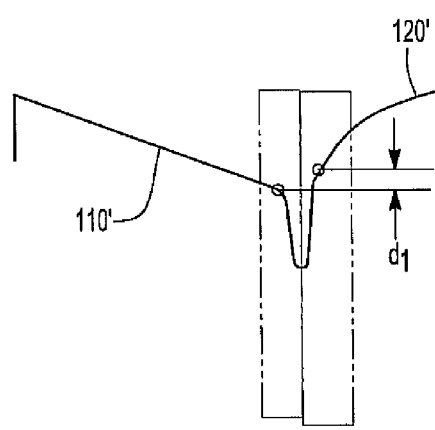
FIG. 6 is a schematic illustration of a 2D laser scan profile of the scan region shown in FIG. 3 and a first dimension taken from the profile.

Referring now to FIGS. 6-10, a number of illustrative examples are shown for how the processor 318 can analyze a 2D laser scan provided by the laser 300. For example, FIG. 6 illustrates a 2D scan provided by the laser 300, the 2D scan having a steering wheel portion 110' and a horn pad portion 120' corresponding to portions of the steering wheel 110 and the horn pad 120, respectively, proximate to the gap 115. On the 2D scan, two predefined locations thereon can be defined by the processor with a first dimension or distance $d_1$ calculated therebetween. It is appreciated that the first dimension $d_1$ for the 2D laser scan can be compared to a stored dimension within the processor 318 and/or memory 320 in order to determine if the dimension $d_1$ is equal to or within a predefined tolerance of the stored dimension. In this manner, the processor 318 can determine whether to activate the OK light 314 or the NG light 316.

Figure 7:
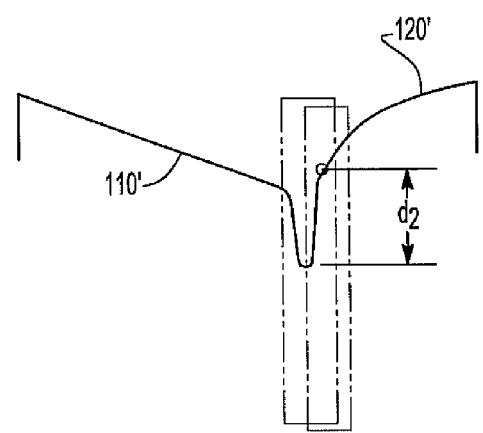
FIG. 7 is a schematic illustration of a 2D laser scan profile of the scan region shown in FIG. 3 and a second dimension taken from the profile.

FIG. 7 shows a second dimension $d_2$ between a bottom portion of the gap 115 and a predefined point on the horn pad scan portion 120'. It is appreciated that from FIGS. 6 and 7, an elevation of the horn pad 120 relative to the steering wheel 110 can be provided.

Figure 8:
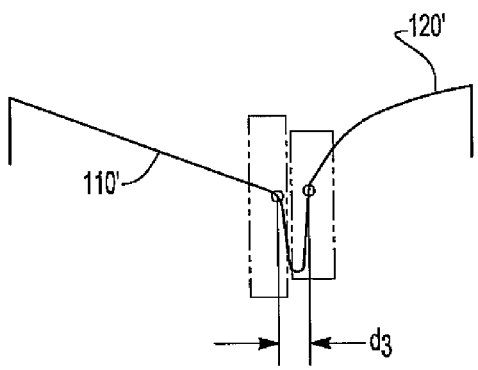
FIG. 8 is a schematic illustration of a 2D laser scan profile of the scan region shown in FIG. 3 and a third dimension taken from the profile.
Figure 9:
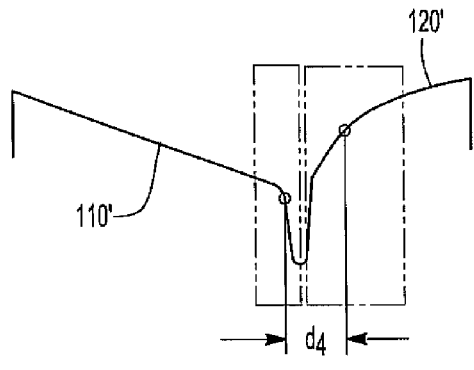
FIG. 9 is a schematic illustration of a 2D laser scan profile of the scan region shown in FIG. 3 and a fourth dimension taken from the profile.

FIG. 8 provides for a lateral distance $d_3$ between the steering wheel 110 and the horn pad 120 by analysis of the steering wheel scan portion 110' and the horn pad scan portion 120'. The processor 318 can detect predefined points on the 2D scan and obtain the measurement $d_3$. Likewise, a different point or location on the steering wheel scan portion 110' and/or the horn pad scan portion 120' proximate to the gap region 115' can provide a fourth dimension $d_4$ as shown in FIG. 9.

Figure 10:
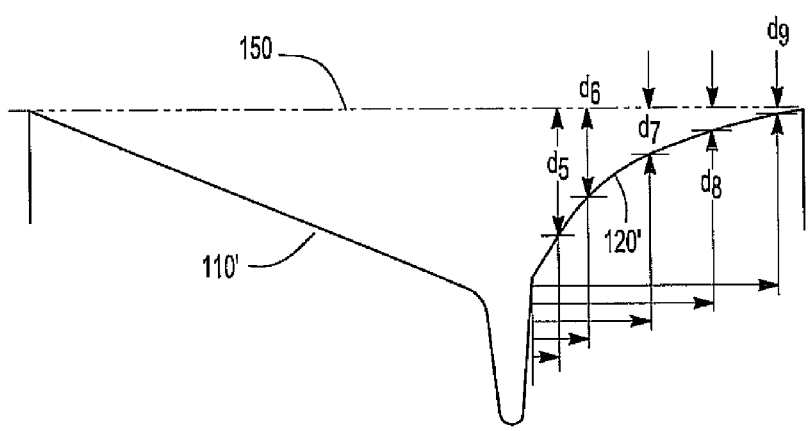
FIG. 10 is a schematic illustration of a 2D laser scan profile of the scan region shown in FIG. 3 with a series of dimensions taken from the profile.

FIG. 10 illustrates an analysis of the 2D scan with a reference line or plane 150 used to measure an elevation distance for the horn pad 120. For example and for illustrative purposes only, distances $d_5$-$d_9$ can be determined between the reference line 150 and predefined locations on the horn pad scan portion 120'. One or more of these distances can be compared with previously stored dimensions in the memory 320, with one or more of the distances falling outside of a predefined tolerance resulting in the activation of the NG light 316. It is appreciated that the reference line 150 can be equated to a bottom surface 211 of the first bar 210, or in the alternative a calculated reference line relative to the steering wheel 110 and the horn pad 120.

A process for determining whether or not a first component is properly attached to a second component can include providing the position detector 20, the steering wheel 110, and the horn pad 120 attached to a steering wheel airbag. The horn pad 120 attached to the steering wheel airbag can be attached to the steering wheel 110 during an assembly line manufacturing process followed by attachment of the jig 200 to the steering wheel. Thereafter, an individual can activate the 2D laser 300, for example by pressing the activation button 312, which affords for a 2D laser scan of the gap 115. The 2D scan is provided to the processor 318 and the processor analyzes the scan and measures a distance such as one or more of the measurements and distances shown in FIGS. 6-10.

Upon determining one or more of the distances $d_1$-$d_9$, the processor 318 can compare the distances(s) with a previously stored value(s) and determine if the distance(s) falls within a predefined tolerance of the previously stored value. In the event that the distance(s) falls within a predefined tolerance, the OK light 314 can be activated to inform an individual on the assembly line that the horn pad 120 and the steering wheel airbag are properly attached to the steering wheel 110 and thus further assembly of the motor vehicle can continue. In the alternative, if the horn pad 120 and thus the steering wheel airbag are not properly attached to the steering wheel 110, the processor 318 can activate the NG light 316 and thus alert the individual that action is needed. In addition, communication of such information to the online processor 400 can slow and/or stop the assembly line until appropriate action is provided.

Although the embodiment 20 is shown for determining whether or not proper attachment of a steering wheel airbag has been provided relative to a steering wheel, it is appreciated that such a device and/or process can include the attachment of other components in which a 2D laser scan of a gap region can be analyzed and used to determine lateral distances and/or elevation distances between the two components with such distances used to determine whether or not proper attachment between the components has occurred. As such, it is to be understood that various modifications are readily made to the embodiments of the present invention described herein without departing from the scope and spirit thereof. In addition, the jig and activation box can be made from any material known to those skilled in the art, illustratively including metals, alloys, ceramics, plastics, wood, and the like. Accordingly, it is to be understood that the invention is not limited by the specific illustrated embodiments, but by the scope of appended claims.

We claim:

1. A steering wheel airbag position detector comprising:
a jig located on a front side of a steering wheel, said jig having:
a first bar with a first flange dimensioned to extend over a circumferential portion of the steering wheel;
a second bar extending at an angle relative to said first bar, said second bar having a pair of spaced apart flanges with each flange dimensioned to rest on a planar support of the steering wheel;
a sensor rigidly attached to said jig, said sensor operable to detect and measure a gap between the steering wheel and a steering wheel airbag attached to the steering wheel;
a processor in communication with said sensor, said processor operable to analyze the measurement of the gap and provide a pass signal and a no-pass signal as a function of the analyzed measurement of the gap.

2. The steering wheel airbag position detector of claim 1, wherein said sensor is selected from a group consisting of a laser, a camera and an ultrasonic transducer.

3. The steering wheel airbag position detector of claim 2, wherein said sensor is a laser operable to perform a two dimensional (2D) laser scan across said gap between the steering wheel and the steering wheel airbag attached to the steering wheel and said processor analyzes said 2D laser scan and provides a pass signal and a no-pass signal as a function of the analyzed 2D laser scan.

4. The steering wheel airbag position detector of claim 3, wherein said processor determines a lateral distance between the steering wheel and the steering wheel airbag from the 2D laser scan.

5. The steering wheel airbag position detector of claim 3, wherein said processor determines an elevation distance between the steering wheel and the steering wheel airbag from the 2D laser scan.

6. The steering wheel airbag position detector of claim 1, wherein said pass signal indicates that the gap is within a tolerance defined by a user and said no-pass signal indicates that the gap is not within the tolerance defined by the user.

7. The steering wheel airbag position detector of claim 3, further comprising a memory operable to store data selected from the group consisting of data in the form of a plurality of 2D laser scans, data in the form of a plurality of pass signals, data in the form of a plurality of no-pass signals and combinations thereof.

8. A process for determining whether or not a steering wheel airbag has been properly attached to a steering wheel, the process comprising:
provided a steering wheel, a steering wheel airbag and a horn pad on the steering wheel airbag;
attaching the steering wheel airbag to a front side of the steering wheel, the steering wheel airbag and the front side of the steering wheel having a gap therebetween;
providing a steering wheel airbag position detector having:
a jig located on a front side of a steering wheel;
a laser rigidly attached to the jig, the laser operable to perform a two-dimensional (2D) laser scan and positioned to scan across a gap between the steering wheel and the horn pad on the steering wheel airbag;
a processor in communication with the laser, the processor operable to analyze the 2D laser scan of the gap, determine a lateral distance or an elevation distance between the horn pad and the steering wheel from the 2D laser scan and provide a pass signal and a no-pass signal as a function of the analyzed 2D laser scan;
analyzing the 2D laser scan using the processor and determining if the gap between the steering wheel and the horn pad is within a tolerance defined by a user, for the purpose of determining whether or not the steering wheel airbag has been properly attached to the steering wheel.

9. The process of claim 8, wherein the processor determines the lateral distance between the horn pad and the steering wheel from the 2D laser scan.

10. The process of claim 8, wherein the processor determines the elevation distance between the horn pad and the steering wheel from the 2D laser scan.

11. The process of claim 8, wherein the processor provides a pass signal if the gap between the steering wheel and the horn pad is within the tolerance defined by the user and a no-pass signal if the gap between the steering wheel and the horn pad is not within the tolerance defined by the user.

12. The process of claim 11, further including an assembly line and a motor vehicle with the steering wheel and steering wheel airbag being assembled on the assembly line, wherein the processor stops the assembly line if a no-pass signal is provided.

13. The process of claim 8, further including a data storage device, the data storage device storing data selected from the group consisting of data in the form of a plurality of 2D laser scans, data in the form of a plurality of pass signals, data in the form of a plurality of no-pass signals and combinations thereof.

14. The steering wheel airbag position detector of claim 1, wherein said first flange is an L-shaped flange.

15. The steering wheel airbag position detector of claim 1, wherein said first flange is a U-shaped flange.

* * * * *